United States Patent [19]

Brymer, Jr.

[11] 3,792,992

[45] Feb. 19, 1974

[54] SPRING MOUNTED CHARGE DROP GUIDING MEANS

[75] Inventor: Andrew E. Brymer, Jr., Toledo, Ohio

[73] Assignee: Owens-Illinois, Inc., Toledo, Ohio

[22] Filed: Sept. 11, 1972

[21] Appl. No.: 288,142

[52] U.S. Cl.......................... 65/303, 65/304, 65/334
[51] Int. Cl............................................ C03b 11/00
[58] Field of Search...................... 65/303, 304, 334

[56] References Cited
UNITED STATES PATENTS
3,239,327   3/1966   Stroud, Jr. et al.................... 65/334

Primary Examiner—Frank W. Miga
Attorney, Agent, or Firm—D. T. Innis; E. J. Holler

[57] ABSTRACT

In the feeding of glass charges in the form of gobs which are severed from a downwardly flowing stream of glass, it is desirable that a drop guide be positioned beneath the cutting plane of the severing shears to prevent the gob or charge of glass from turning about its vertical axis. The adjustable mounting of drop guides is conventional practice, with the present invention being directed essentially to mounting the drop guide to its arm or support by means of a fairly flexible spring so as to permit successive gobs of slightly larger diameter or smaller diameter to be influenced by the drop guide but without sufficient force to disturb the vertical drop of the charge.

4 Claims, 2 Drawing Figures

SPRING MOUNTED CHARGE DROP GUIDING MEANS

BACKGROUND OF THE INVENTION

It has been the practice in the past to mount drop guides for guiding severed gobs of glass from beneath the feeder to funnels or deflectors positioned therebelow. A good example of the drop guide mounting arrangement is shown in U.S. Pat. No. 2,681,530 to Peiler. The drop guides 434 and 435 of Peiler are clearly shown to be adjustable both in their distance from the pivot point of the arm supporting them and toward and away from the vertical axis passing through the point of severance of the shears. Another example of a prior art drop guide mounting arrangement is shown and described in U.S. Pat. No. 3,579,319 to Wythe et al., in which it can be seen that the drop guide 40 and the block 34 to which it is mounted may be shifted vertically and the guide itself may be shifted horizontally with respect to the block 34. These adjustments may be effected during the operation of the shear mechanism with which the drop guide is intimately associated.

One problem involved in the severing of glass gobs, which is present in both Peiler and Wythe et al., is the inability of the drop guides to accommodate charges which are slightly larger than the predetermined diametrical dimension of the ideal gob. It is a well recognized fact that successively severed charges of glass frequently are not identical in shape. In particular, the gobs may vary slightly in diameter, even with the most closely controlled feeder mechanism. This is primarily true because molten glass forehearths and feeders are subject to slight ambient changes in temperature which in turn will affect the viscosity of the glass issuing from an orifice in the bottom thereof. With slight changes in viscosity of the glass, slight variations in the gob dimension will necessarily occur. While the drop guides of the prior art are fairly satisfactory in preventing throwing of the gobs to one side, it is certain that with changing gob diameters, the drop guide will contact successive gobs with more or less force simply because the drop guide will always move into the same vertical plane relative to the axis of the gobs in each cycle of the operation of the feeder and if the gob is larger, the guide will strike the gob with greater force.

One of the fundamental problems with respect to feeding of glass gobs which are severed by overlapping knives, as shown in Peiler and Wythe et al., is that the upper end of the gob, after severance, tends to move or be pushed in the direction of movement of the lower cutting or shear blade, thus the drop guides are always positioned in association with the top knife or shear blade. In the Wythe et al. reference, the drop guide is mounted to and carried by the same mechanism which operates the upper shear blade. In Peiler, the drop guides are separately mounted on their own arms, which in turn are pivoted to the shear arm and move together with the shear arm as the shear arm is oscillated.

SUMMARY OF THE INVENTION

A glass gob feeding apparatus in which reciprocally actuated shear blades are used to sever charges of glass and mold charge drop guides are moved with the upper shear blade and in which the mounting of the drop guide to its mounting means or arm is by an easily compressible spring.

DETAILED DESCRIPTION OF THE DRAWINGS

As stated above in the background of the invention, the glass feeder shear mechanism is a part of this invention only in terms of its providing the setting for applicant's improvement in the mounting of the drop guides relative to their supporting arms.

Figure 1:
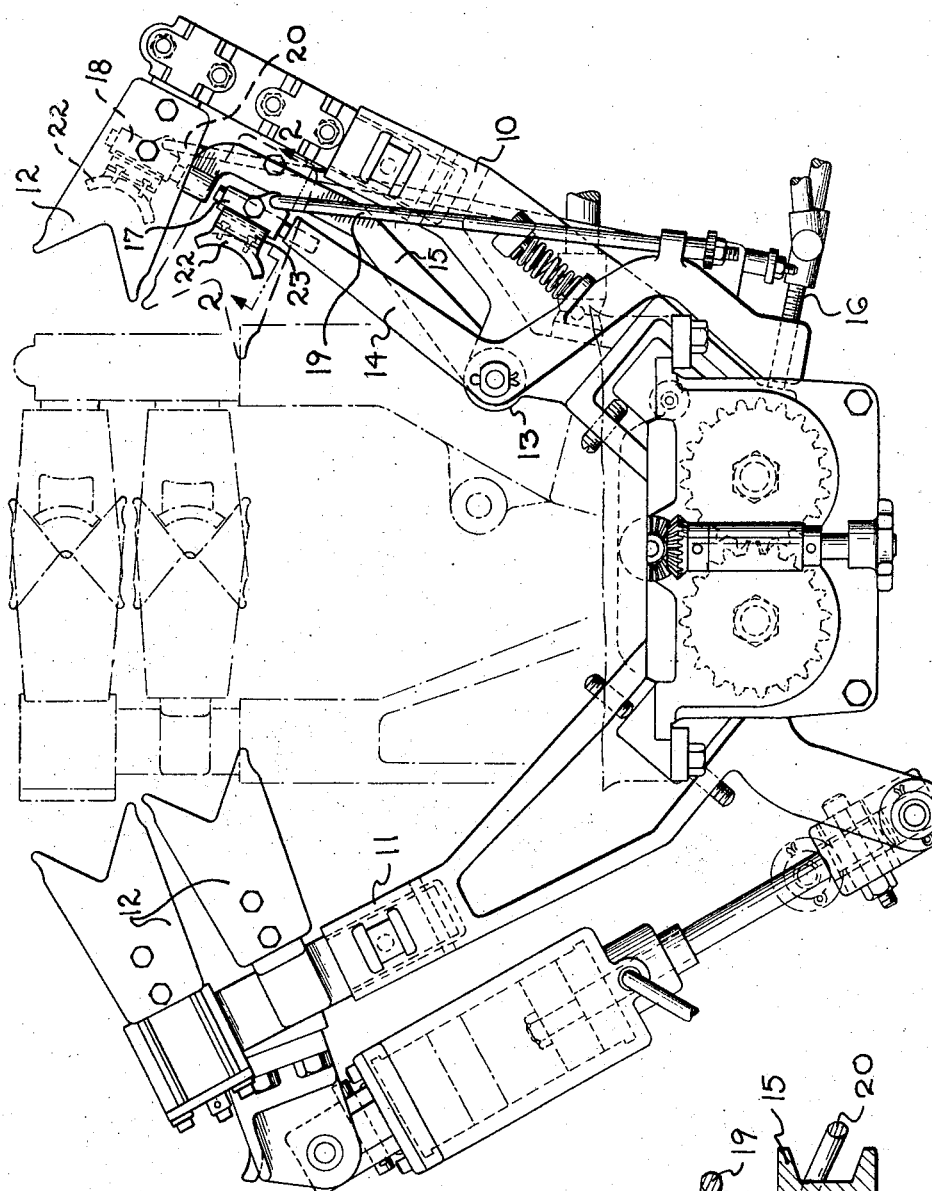
FIG. 1 is a top plan view of the glass shearing mechanism with the drop guides of the invention mounted thereon.

As shown in the drawings, a pair of arms 10 and 11 carrying shear blades 12 are adapted to be reciprocated so as to move from the full line position to the dotted line position, whereat they will have substantially completed the severance of a stream of glass into a mold charge or gob. It should be pointed out that the arm 10 carries the upper shear blades and is provided with a boss 13. The boss 13 serves as the pivot point for a pair of arms 14 and 15. Both the arms 14 and 15 have essentially the same or identical configuration in that portion thereof which is toward the bottom of FIG. 1 with this end of the arms being provided with threaded shafts 16 (only one of which may be seen). The shafts 16 may be rotated with their forward end abutting the side of the arm 10, thus determining the gap between the arm 14 and arm 10 and in turn determining the relative position of the extending portion of arm 14 relative to arm 10.

A first drop guide mounting block 17 is carried by the forward or extending end of arm 14. A second drop guide mounting block 18 is carried by the forward end of arm 15. Adjusting rods 19 and 20 are connected to their respective mounting blocks 17 and 18 and serve to adjustably position the mounting blocks length-wise on their arms 14 and 15.

Both mounting blocks 17 and 18 have, bolted to their forward faces, one upright of substantially U-shaped, flat spring members 21. The opposite upright of the U-shaped spring members 21 have bolted thereto and support an aluminum drop guide 22. The spring member 21 is also formed with an horizontally extending portion 23 at the upper end thereof extending from the upright portion to which the drop guides are connected and extending in the direction of the other upright portion of the U-shaped member. This horizontal portion 23 is bent downwardly at 24 in overlying relationship with respect to the portion of the spring member which is fastened or connected to the mounting block.

Figure 2:
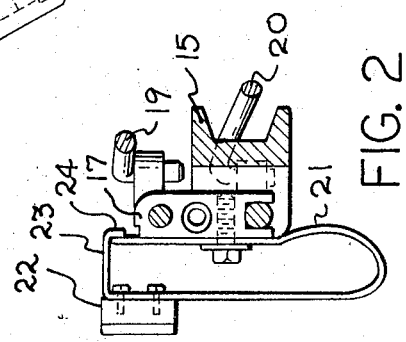
FIG. 2 is a sectional view, on an enlarged scale, taken at line 2—2 of FIG. 1.

As particularly shown in FIG. 2, this configuration of the spring member 21, with the turned down portion 24, serves to prevent relative movement of the drop guide 22 and its mounting block 17 except in the direction toward each other.

In operation, the usual adjustments of the positions of the drop guides are made to give the proper, precise alignment of the guides relative to the axis of the severed gobs. The proper adjustment will assure that the gobs will fall, vertically, without any appreciable horizontal component.

However, as previously explained, slight variations in viscosity of the glass will cause variations in the diameter of the gobs, and with the present invention, enlargement of the gob diameter will not result in touching of the gob with excessive force because the guide mounting spring will give, to compensate for this diameter change.

The spring of the invention was operated on a glass feeder, and was formed of what is termed "shim stock" with an aluminum block supported by the spring. With slight upsets in the feeder operation, no upsets in the guiding of gobs occured, and precise loading of gobs in the parison molds was accomplished.

I claim:

1. In a glass gob feeding apparatus having reciprocally actuated first arms carrying the shear blades and a second arm carrying a gob drop guide and movable with the upper one of said blades, said second arm moving in a horizontal plane beneath the plane of both shear blade carrying arms, the improvement comprising resilient means mounting said drop guide to said second arm.

2. The apparatus of claim 1 wherein said resilient means is in the form of an U-shaped spring member with the guide fixed to one upright of the U and the other upright being fixed to the arm.

3. The apparatus of claim 2 further including, means connected to said U-shaped spring for limiting the relative separation of the upper ends of said U.

4. The apparatus of claim 3 wherein said means for limiting separation comprises, an horizontally extending member attached at one end to one upright of said U-member and a downwardly bent portion overlying the other upright end of said U-member.

* * * * *